(12) United States Patent
Xu et al.

(10) Patent No.: US 6,280,655 B1
(45) Date of Patent: Aug. 28, 2001

(54) HIGH-LUMINOSITY STRESS-LUMINESCENT MATERIAL

(75) Inventors: Chaonan Xu, Tosu; Tadahiko Watanabe, Saga; Morito Akiyama; Kazuhiro Nonaka, both of Tosu, all of (JP)

(73) Assignee: Japan as represented by Secretary of Agency of Industrial Science and Technology, Tokyo-to (JP)

( * ) Notice: Subject to any disclaimer, the term of this patent is extended or adjusted under 35 U.S.C. 154(b) by 0 days.

(21) Appl. No.: 09/468,899

(22) Filed: Dec. 22, 1999

(30) Foreign Application Priority Data

Aug. 6, 1999 (JP) .................................... 11-223516

(51) Int. Cl.[7] .................................................. C09K 11/00
(52) U.S. Cl. .................................. 252/301.4 R; 501/120; 501/125; 423/600
(58) Field of Search ...................... 252/301.4 R; 423/600; 501/120, 125

(56) References Cited

U.S. PATENT DOCUMENTS 3,294,699 * 12/1966 Lange ............................ 252/301.4 R
4,584,151 * 4/1986 Matsui et al. ........................ 501/120
5,686,022 * 11/1997 Murayama et al. .......... 252/301.4 R

* cited by examiner

*Primary Examiner*—C. Melissa Koslow
(74) *Attorney, Agent, or Firm*—Wenderoth, Lind & Ponack, L.L.P.

(57) ABSTRACT

Disclosed is a high-efficiency stress-luminescent material capable of emitting luminescence by receiving a mechanical stress such as compression, shearing and rubbing. The stress-luminescent material is an alkaline earth aluminate of a non-stoichiometric composition deficient in the content of the alkaline earth element by 0.01 to 20% by moles from stoichiometry. The efficiency of stress-luminescence emission can be further enhanced when the non-stoichiometric alkaline earth aluminate contains 0.01 to 10% by moles of rare earth metal ions or transition metal ions. The stress-luminescent material is prepared by subjecting a non-stoichiometric composite oxide of aluminum oxide and an alkaline earth oxide to a calcination treatment at 800 to 1700° C. in a reducing atmosphere.

7 Claims, 3 Drawing Sheets

LOAD, kN

HIGH-LUMINOSITY STRESS-LUMINESCENT MATERIAL

BACKGROUND OF THE INVENTION

The present invention relates to a novel stress-luminescent material of high luminosity which is a material capable of emitting intensive luminescence when stressed by receiving a mechanical force as well as a method for the preparation of such a stress-luminescent material and a method for obtaining luminescence by using the stress-luminescent material.

It is well known in the prior art that certain materials called a phosphor exhibit luminescence which is a phenomenon to emit visible light at or in the vicinity of room temperature when the material receives stimulation from outside. Phosphor materials capable of emitting luminescence are widely employed in lighting devices such as fluorescent lamps and displays such as cathode ray tubes (CRT).

The stimulation from outside to cause the phenomenon of luminescence is given conventionally by ultraviolet light, electron beams, X-rays, ionizing radiations, electric fields, chemical reactions and so on. There are found, however, very few reports that certain materials can emit luminescence when stressed by receiving stimulation from outside such as a mechanical force. Such a material is referred to as a stress-luminescent material hereinafter.

SUMMARY OF THE INVENTION

The present invention accordingly has an object to provide a novel stress-luminescent material capable of efficiently emitting luminescence when stressed by receiving a mechanical stimulation such as rubbing, shearing, impact, compression, tension and the like even in the absence of any conventional stimulations such as ultraviolet light, electron beams, X-rays, ionizing radiations, electric fields, chemical reactions and so on. Thus, the novel stress-luminescent material of high intensity provided by the present invention is basically an aluminate compound which is a composite oxide consisting of aluminum oxide and an alkaline earth metal oxide having a non-stoichiometric composition with deficiency relative to the alkaline earth metal ions as represented by the composition formula of $M_xAl_2O_{3+x}$, $M_xQAl_{10}O_{16+x}$, $M_{x1}Q_{x2}Al_2O_{3+x1+x2}$ or $M_{x1}Q_{x2}LAl_{10}O_{16+x1+x2}$, in which M, Q and L are each an alkaline earth metal element selected from the group consisting of magnesium, calcium, strontium and barium, x is a positive number larger than 0.8 but smaller than 1.0 and x1 and x2 are each 0 or a positive number with the proviso that (x1+x2) is larger than 0.8 but smaller than 1.0.

DETAILED DESCRIPTION OF THE PREFERRED EMBODIMENTS

Figure 1:
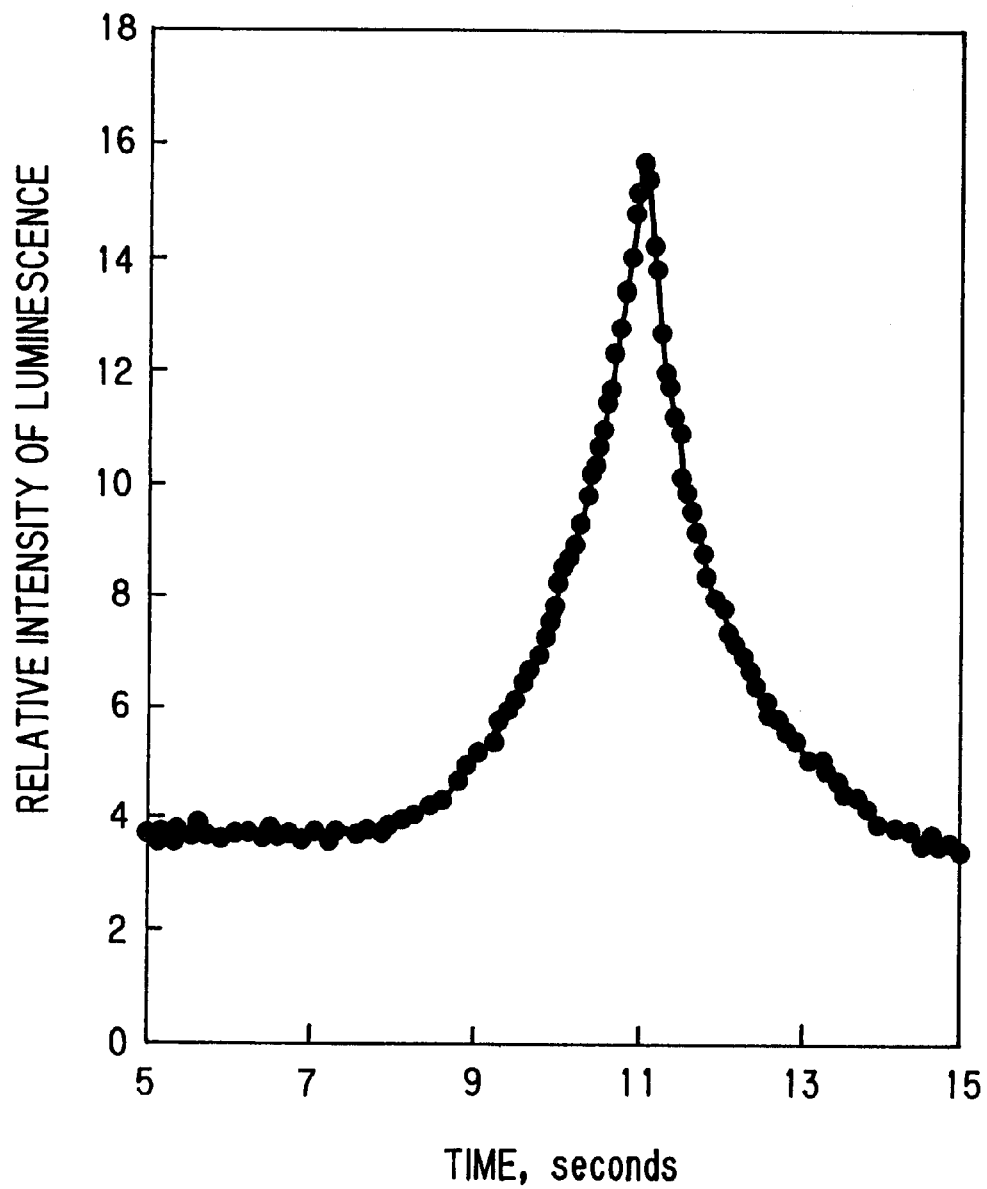
FIG. 1 is a graph showing the relative intensity of luminescence emitted from a stress-luminescent material of the invention having a composition of the formula $Sr_{0.99}Al_2O_{3.99}$ and changing in time after receiving a mechanical force of 1000 N on a material testing machine.

The above defined novel stress-luminescent material has been developed on the base of the inventors' discovery that, when an aluminate compound of a non-stoichiometric chemical composition having lattice defects and optionally containing metallic activator ions to serve as the luminescence center receives a mechanical energy, luminescence is emitted therefrom by return of the carriers excited by the mechanical energy to the ground state.

Namely, the stress-luminescent material of the invention is an alkaline earth aluminate compound having a non-stoichiometric chemical composition to have lattice defects by virtue of which luminescence is emitted when carriers excited by receiving mechanical energy return to the ground state. The matrix substance of the non-stoichiometric aluminate compound can optionally contain at least one kind of metallic ions selected from rare earth metal ions and transition metal ions as the center ions in the luminescence center.

The above mentioned stress-luminescent material according to the invention is prepared by calcination of a non-stoichiometric aluminate compound which is a composite oxide consisting of aluminum oxide and an alkaline earth metal oxide, in which the molar content of the alkaline earth oxide ions deviates from the stoichiometric proportion to be lower by 0.01 to 20% by moles and optionally containing an oxide of at least one kind of metallic elements selected from the group consisting of rare earth elements and transition metal elements in an amount of 0.01 to 10% by moles calculated as metallic atoms, in a reducing atmosphere at a temperature in the range from 800 to 1700° C.

Thus, the luminescent material of the present invention is a substance having lattice defects, which contribute to emission of luminescence by return of carriers excited by the mechanical energy to the ground state, optionally containing rare earth metal ions or transition metal ions as the center ions in the luminescence center. The above mentioned substance having lattice defects in the present invention is provided by an aluminate compound having a non-stoichiometric chemical composition. The non-stoichiometric chemical composition here implied is a chemical composition deviating from a composition expressed by a composition formula of a compound satisfying the valency relationships among the constituent elements.

The aluminate compound having a non-stoichiometric chemical composition is a composite oxide consisting of aluminum oxide and an alkaline earth metal oxide which is deficient, preferably, in the content of the alkaline earth metal ions. Such an alkaline earth-deficient non-stoichiometric aluminate compound is expressed by the formula:

$M_xAl_2O_{3+x}$, $M_xQAl_{10}O_{16+x}$, $M_{x1}Q_{x2}Al_2O_{3+x1+x2}$ or $M_{x1}Q_{x2}LAl_{10}O_{16+x1+x2}$, in which M, Q and L are each an alkaline earth metal element selected from the group consisting of magnesium, calcium, strontium and barium, x is a positive number larger than 0.8 but smaller than 1.0 and x1 and x2 are each 0 or a positive number with the proviso that (x1+x2) is a positive number larger than 0.8 but smaller than 1.0, of which those expressed by the formula $Sr_xAl_2O_{3+x}$ or $Sr_xMgAl_{10}O_{16+x}$ are preferable.

The intensity of stress-luminescence of the inventive luminescent material can be remarkably increased, even in the absence of other metallic ions as the center ions in the luminescence center, by adequately controlling the density of defects which is expressed by the value of (1−x) or (1−x1−x2), in which x, x1 and x2 have the same definition as in the above given composition formulas. Control of the density of defects can be accomplished by adequately selecting the molar proportion of the starting materials taken in the preparation of the luminescent material and the conditions of calcination. For example, control of the density of defects to obtain an alkaline earth-deficient non-stoichiometric aluminate compound is facilitated by deliberately decreasing the molar proportion of the alkaline earth element in the starting materials and by conducting the calcination treatment in a reducing atmosphere.

While the density of defects can be controlled by the deficiency of the alkaline earth metal ions, as is mentioned above, the proportion of the defects is selected, preferably, in the range from 0.01 to 20% by moles or, more preferably, from 0.01 to 10% by moles. When the molar proportion of the deficiency is too small, the intensity of stress-luminescence cannot be high enough and, when the proportion of the deficiency is too large, the crystalline structure of the substance can no longer be maintained resulting in a decrease in the efficiency of luminescence emission so that the luminescent material is not suitable for practical use.

Such a substance has lattice defects which emit luminescence when carriers excited by mechanical energy return to the ground state so that the substance per se can be used as a luminescent material capable of exhibiting high-intensity stress-luminescence characteristics.

The intensity of luminescence can be further increased to accomplish higher luminosity by adding, to the above described substance, rare earth metal ions or transition metal ions as the center ions in the luminescence center. The rare earth metal element includes scandium, yttrium and the elements having an atomic number of 57 to 71. The transition metal element is exemplified by titanium, zirconium, vanadium, chromium, manganese, iron, cobalt, nickel, copper, zinc, niobium, molybdenum, tantalum and tungsten.

Although the luminescent material may contain either a single kind or a combination of two kinds or more of these additive ions as the center ions in the luminescence center without particular limitations, different kinds of additive ions should be selected depending on the crystalline structure of the matrix substance in order to optimize the efficiency of luminescence emission. For example, europium ions and cerium ions are the most efficient for $M_xAl_2O_{3+x}$ and europium ions are efficient also for $M_xQAl_{10}O_{16+x}$ as the matrix substance.

The amount of the additive metallic ions contained in the matrix substance as the center ions in the luminescence center is preferably in the range from 0.01 to 10% by moles or, more preferably, from 0.01 to 8% by moles. When the amount thereof is too small, the improving effect on the efficiency of luminescence would be insufficient for practical use as a matter of course while, when the amount thereof is too large, the crystalline structure of the matrix substance can no longer be maintained resulting in a decrease in the efficiency of luminescence emission.

The stress-luminescent material of the invention can be prepared in the following manner. Thus, the first step of the preparation process is for the preparation of a powder of an alkaline earth aluminate compound of a non-stoichiometric chemical composition deficient in the content of the alkaline earth metal element with a deviation of 0.01 to 20% by moles from the stoichiometric proportion relative to aluminum oxide and the alkaline earth metal oxide. Though optional, the non-stoichiometric aluminate compound in the form of a powder is uniformly blended with a powder of oxide of a rare earth element or a transition metal element in an amount of 0.01 to 10% by moles calculated as the metallic atoms. The aluminate powder or a blend thereof with an additive oxide is then subjected to a calcination treatment at a temperature in the range from 800 to 1700° C. in an atmosphere of a reducing gas. It is optional that the aluminate powder is admixed with a flux material such as boric acid in order to further increase the efficiency of luminescence emission by promoting the calcination treatment.

Though dependent on the nature of the mechanical force to serve as the excitation source for stress-luminescence, the intensity of the luminescence is increased usually as the mechanical force is increased. This relationship between the strength of the mechanical force and the intensity of luminescence serves to give a measure of the relative strength of the mechanical force added to the material. A non-contacting method is provided accordingly to detect the stressed state of a solid material by determining the intensity of stress-luminescence. Namely, a possibility is given by utilizing this relationship in a wide field such as a stress detector because the stressed state of a material can be visualized.

The stress-luminescent material of the present invention is physically and chemically stable under widely varied ambient conditions and, when stressed by receiving a mechanical force, emits luminescence by return of the excited carriers in the lattice defects or in the lattice defects and luminescence center to the ground state. This luminescent material of the present invention therefore can be employed under a variety of ambient conditions to emit luminescence, for example, not only in air, in vacuum and in a reducing or oxidizing atmosphere but also in various liquids including water, inorganic solutions and organic solutions by receiving a mechanical force.

The luminescent material of the present invention works well to emit luminescence of high intensity not only as such but also in the form of a composite body with other inorganic or organic materials when the composite body is stressed by receiving a mechanical force. For example, the luminescent material of the invention is blended with an organic material such as a synthetic resin or embedded in a plastic article to form a composite body which is stressed by the application of a mechanical force so that the luminescence material therein emits luminescence.

An alternative form of such a composite body can be obtained by coating the surface of a substrate made of other materials such as metals with a coating layer of the inventive luminescent material. When the thus coated body is stressed by a mechanical force, the coating layer of the luminescent material is also stressed to emit luminescence. This way of utilization of the inventive luminescent material is advantageous when a large luminescence-emitting surface area is desired with a relatively small amount of the inventive luminescent material.

In the following, the present invention is described in more detail by way of examples which, however, never limit the scope of the invention in any way. Example.

Aluminum oxide and an alkaline earth metal carbonate were taken by weighing each in a specified amount and uniformly blended to give a proportion corresponding to the composition formula,

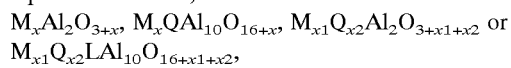

in which M, Q and L are each an alkaline earth metal element including magnesium, calcium, strontium and barium and x and (x1+x2) are each 0 or a positive number of 0.995, 0.990, 0.950, 0.900 or 0.800. The powder blend was subjected to calcination first in air at 800° C. for 60 minutes and then in a reducing atmosphere of a 95:5 by volume mixture of argon and hydrogen at 1300° C. for 4 hours followed by disintegration of the calcined mass into a powder of a stress-luminescent material.

The powder of the luminescent material was subjected to evaluation of the efficiency of luminescence emission in three different forms (1) to (3) described below.

(1) Measurements of luminescence were performed for pellets of the sample powder prepared by compression-molding the powder in a metal mold into a powder compact which was consolidated under a hydrostatic pressure of 3 GPa followed by a calcination treatment at 1500° C. for 4 hours.

(2) Measurements of luminescence were performed for resin-bonded pellets prepared from a blend of the sample powder and an epoxy resin as a binder in a weight proportion of 1:1.

(3) Measurements of luminescence were performed for stainless steel pellets having a 0.1 mm thick coating layer of a resin blend prepared from the sample powder and an epoxy resin in a weight proportion of 1:1.

The measurements with these three different forms of test specimens gave substantially the same results as a trend.

FIG. 1 of the accompanying drawing is a graph showing the relative intensity of luminescence emitted from the compression-molded and calcined pellets of the luminescent material of the invention having a composition of the formula $Sr_{0.99}Al_2O_{3.99}$ and changing in time after receiving a mechanical force of 1000 N on a material testing machine. The luminescence emitted from this luminescent material with a strontium deficiency of 1% by moles was so strong as to be clearly recognized by naked eyes.

Figure 2:
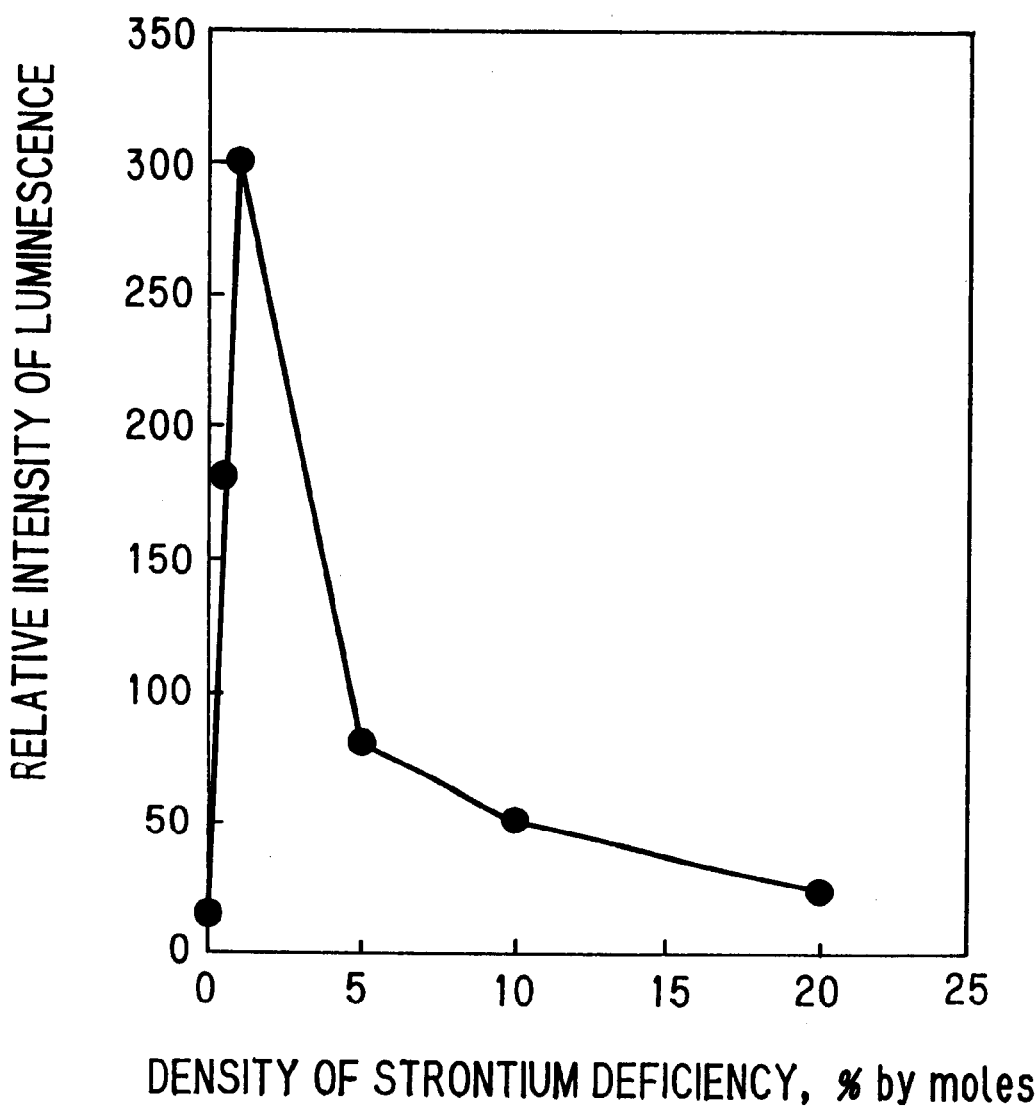
FIG. 2 is a graph showing the relative intensity of luminescence emitted from inventive stress-luminescent materials of the formula $Sr_xAl_2O_{3+x}$ by receiving a compressive force of 1000 N as a function of density of strontium deficiency (1−x).

FIG. 2 is a graph showing the relative intensity of luminescence emitted from the resin-bonded pellets of the inventive luminescent materials of the formula $Sr_xAl_2O_{3+x}$ by receiving a compressive force of 1000 N as a function of the degree of strontium deficiency. As is clear by making comparison with a stoichiometric sample without strontium deficiency, i.e. x=1, the intensity of luminescence could be greatly increased when the sample had a deficiency in strontium. This trend was the same also for triboluminescence by rubbing. The trends of stress-luminescence emission shown by the curves in FIGS. 1 and 2 were followed also in other luminescent materials according to the invention.

Measurements of luminescence were further conducted in various liquid media including water, ethanol, acetone and hydrochloric acid of 0.1 mole/liter concentration to obtain substantially identical results as a trend for each liquid medium. Table 1 shows the relative intensities of luminescence obtained by the measurements in air, water, ethanol and acetone for the resin-bonded pellet samples. The samples shown in Table 1 include those with admixture of rare earth metal ions or transition metal ions with an object of enhancing the intensity of luminescence and samples for comparative purpose which were each a stoichiometric alkaline earth aluminate without deficiency in the alkaline earth element.

TABLE 1

| | Relative intensity of luminescence in | | | |
|---|---|---|---|---|
| | air | water | ethanol | acetone |
| Example | | | | |
| $Mg_{0.90}Al_2O_{3.90}$ | 150 | 100 | 130 | 140 |
| $Sr_{0.90}Al_2O_{3.90}$ | 5200 | 3900 | 4600 | 4800 |
| $Sr_{0.95}Al_2O_{3.95}$ | 11000 | 7300 | 8800 | 9500 |
| $Sr_{0.80}Al_2O_{3.80}$ | 1000 | 650 | 760 | 930 |
| $Sr_{0.99}Al_2O_{3.99}$ | 21000 | 15000 | 1800 | 1900 |
| $Sr_{0.90}Al_2O_{3.90}:Eu_{0.01}$ | 64000 | 44000 | 51000 | 57000 |
| $Mg_{0.90}Al_2O_{3.90}:Ce_{0.01}$ | 3100 | 2200 | 2700 | 2900 |
| $Ca_{0.90}Al_2O_{3.90}:Eu_{0.01}$ | 1100 | 690 | 860 | 9200 |
| $Sr_{0.90}MgAl_{10}O_{16.90}$ | 2000 | 1500 | 1700 | 1800 |
| $Sr_{0.90}MgAl_{10}O_{16.90}:Eu_{0.01}$ | 40000 | 29000 | 3600 | 3800 |
| $Sr_{0.90}MgAl_{10}O_{16.90}:Eu_{0.05}$ | 2000 | 1400 | 1700 | 1800 |
| $Ba_{0.90}MgAl_{10}O_{16.90}$ | 50 | 38 | 40 | 45 |
| $Ba_{0.90}MgAl_{10}O_{16.90}:Eu_{0.01}$ | 130 | 90 | 110 | 120 |
| $Sr_{0.50}Ba_{0.40}MgAl_{10}O_{16.90}:Eu_{0.0}$ | 1700 | 1100 | 1500 | 1600 |
| $Sr_{0.70}Ba_{0.20}MgAl_{10}O_{16.90}:Eu_{0.01}$ | 6300 | 4200 | 5500 | 5900 |
| Comparative Example | | | | |
| $MgAl_2O_4$ | 25 | 18 | 20 | 22 |
| $SrAl_2O_4$ | 26 | 18 | 22 | 23 |
| $CaAl_2O_4$ | 21 | 16 | 19 | 20 |
| $SrMgAl_{10}O_{17}$ | 22 | 17 | 20 | 21 |
| $NaMgAl_{10}O_{17}$ | 10 | 8 | 9 | 9 |
| $Sr_{0.60}Ba_{0.40}MgAl_{10}O_{17}$ | 15 | 10 | 12 | 13 |
| $Sr_{0.80}Ba_{0.20}MgAl_{10}O_{17}$ | 19 | 15 | 17 | 17 |

As is clear from the results shown in Table 1, the intensity of stress-luminescence of the alkaline earth-deficient samples could be further enhanced by the addition of rare earth metal ions or transition metal ions. Although the intensity of the stress-luminescence was influenced by the optical properties of the liquid medium such as scattering, refractive index, absorption coefficient and others, the trends were substantially similar to those shown in FIGS. 1 and 2.

Figure 3:
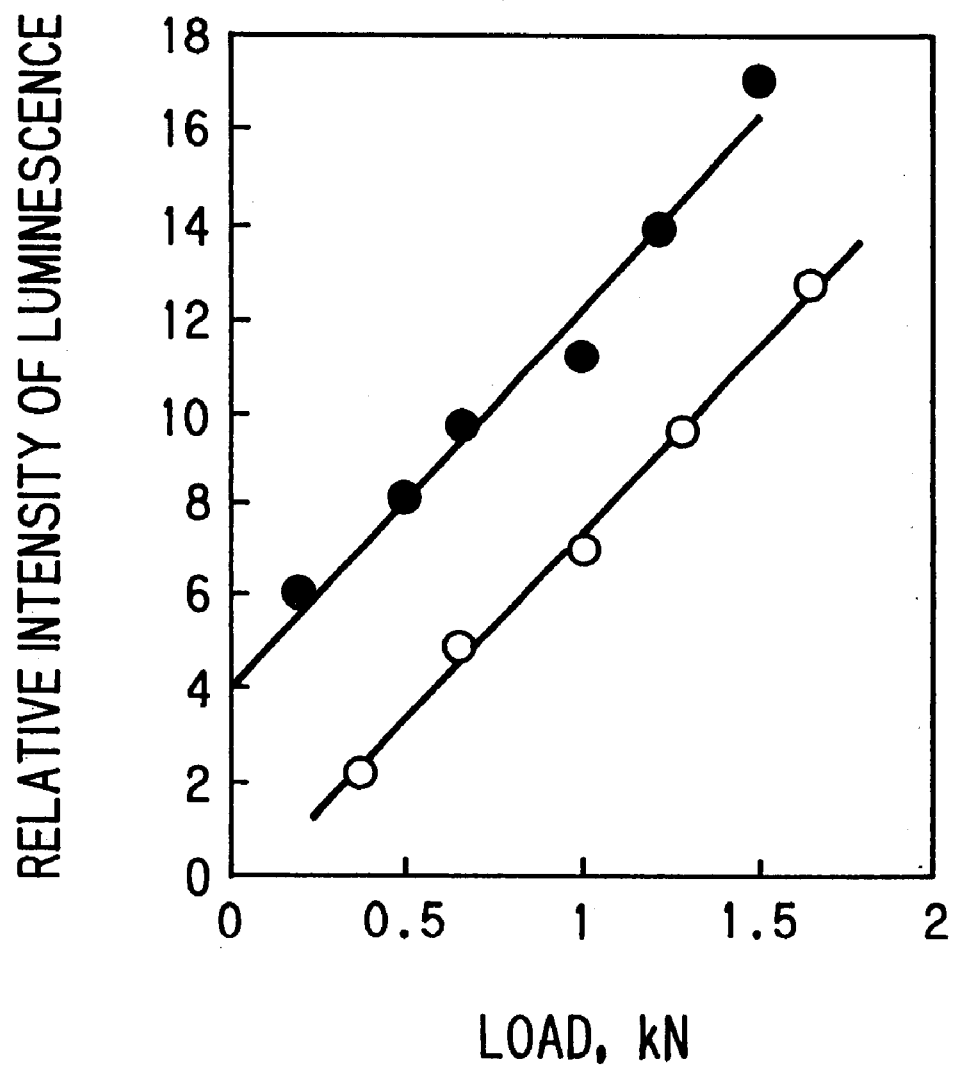
FIG. 3 is a graph showing the relative intensity of luminescence emitted from the inventive stress-luminescent material of the formula $Sr_{0.90}Al_2O_{3.90}:Eu_{0.01}$ as a function of stress in air (curve I) and in water (curve II).

FIG. 3 is a graph showing the relative intensity of luminescence emitted from the inventive luminescent material of the formula $Sr_{0.90}Al_2O_{3.90}:Eu_{0.01}$ as a function of the stress therein as measured in air (curve I) and in water (curve II). As is shown in this figure, the intensity of luminescence depends on the stress on the luminescent material and increases as the stress increases. Accordingly, the intensity of stress-luminescence serves to give a measure for the estimation of the stress on the body. This trend shown in FIG. 3 was followed also in other luminescent materials according to the invention.

What is claimed is:

1. A method for emission of luminescence which comprises applying a mechanical stress to a stress-luminescent material which is a non-stoichiometric alkaline earth aluminate having deficiency in the alkaline earth element.

2. The method according to claim 1 wherein the stress-luminescent material is a non-stoichiometric alkaline earth aluminate expressed by the formula $M_xAl_2O_{3+x}$, $M_xQAl_{10}O_{16+x}$, $M_{x1}Q_{x2}Al_2O_{3+x1+x2}$ or $M_{x1}Q_{x2}LAl_{10}O_{16+x1+x2}$, in which M, Q and L are each an alkaline earth metal element selected from the group consisting of magnesium, calcium, strontium and barium, x is a positive number larger than 0.8 but smaller than 1.0 and x1 and x2 are each 0 or a positive number with the proviso that (x1+x2) is larger than 0.8 but smaller than 1.0.

3. The method according to claim 1 wherein the deficiency of the alkaline earth metal element relative to the stoichiometric composition is in the range from 0.01% to 20% by moles.

4. The method according to claim 1 wherein the stress-luminescent material further contains additive ions of a rare earth element or a transition metal element in an amount in the range from 0.01 to 10% by moles.

5. The method according to claim 4 in which the additive ions are ions of a rare earth element.

6. The method according to claim 5 in which the rare earth element is europium or cerium.

7. The method according to claim 2 wherein the stress-luminescent material is a non-stoichiometric alkaline earth aluminate having a chemical composition expressed by the formula $Sr_xAl_2O_{3+x}$ or $Sr_xMgAl_{10}O_{16+x}$.

\* \* \* \* \*